Aug. 24, 1926.
D. F. PRISER
WATER HEATER
Filed Nov. 7, 1924
1,597,618
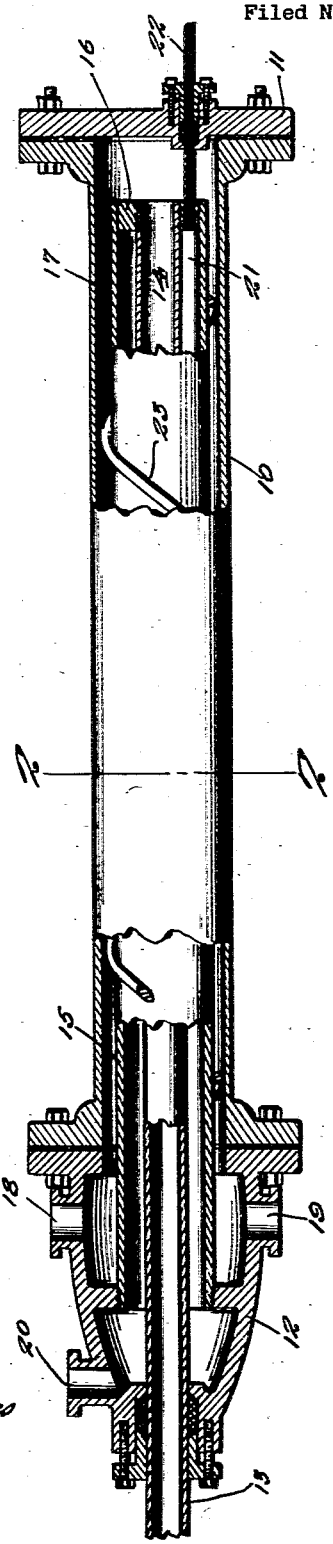
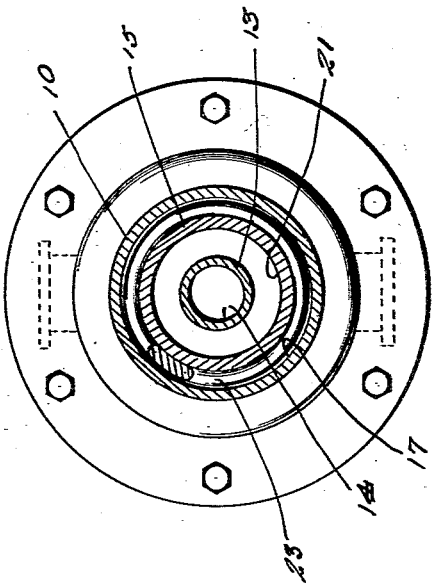
David F. Priser
INVENTOR
BY Victor J. Evans
ATTORNEY Patented Aug. 24, 1926.

1,597,618

UNITED STATES PATENT OFFICE.

DAVID F. PRISER, OF NORTH MANCHESTER, INDIANA, ASSIGNOR TO INSTANT WATER HEATER COMPANY, OF NORTH MANCHESTER, INDIANA, A CORPORATION OF INDIANA.

WATER HEATER.

Application filed November 7, 1924. Serial No. 748,467.

This invention relates to water heaters and is an improvement upon a heater disclosed in Patent No. 1,554,654, granted to me September 22, 1925.

Like the heater mentioned, the heater of the present application aims to utilize steam as a heating agent, the construction being such as to transfer all of the heat of the steam to the water and thus provide for an instantaneous heating of the water as it passes through the heater.

To accomplish this means are provided for rapidly condensing the steam within the heater, while the water to be heated is so located as to absorb the heat dispelled during the process of condensation.

Another object of the invention is the provision of means for insuring a breaking up and proper distribution of water around the condensing chamber of the heater.

With the above and other objects in view, the invention further includes the following novel features and details of construction, to be hereinafter more fully described, illustrated in the accompanying drawings and pointed out in the appended claim.

In the drawings:—

Figure 1 is a view partly in section illustrating a heater constructed in accordance with the invention.

Figure 2 is an enlarged sectional view on the line 2—2 of Figure 1.

Referring to the drawings in detail wherein like characters of reference denote corresponding parts, the reference character 10 indicates the outer casing of the heater which is preferably cylindrical and which is provided at one end with a head 11 and at its opposite end with a head 12, the latter being hollow.

Extending into the outer casing through the head 12 is an inner cylindrical casing 13 which provides an inner water circulating passage 14. This passage opens at its inner end into the casing 10. Secured within the head 12 is one end of an intermediate casing 15 which also extends into the outer casing 10 and is spaced from said casing and from the inner casing 13 and has its inner end secured to a spacing ring 16 which is also secured to the inner end of the inner casing 13. An outer water passage 17 is thus provided between the intermediate casing 15 and the outer casing 10, the inner end of this passage communicating with the inner end of the inner water passage 14. Water may thus enter through the inner passage 14 and pass through the outer passage 17 to a water outlet 18 provided in the head 12. A normally closed drain opening 19 is also provided in the head 12.

The end of the intermediate passage 21 opens into the head 12 and the latter is provided with a steam inlet 20, whereby steam may be introduced into the space between the passages 14 and 17, the said space forming a condensing chamber 21. The inner end of the chamber 21 has extending thereinto a relatively small pipe 22. This pipe extends through the head 11 and may be in communication with an automatic condensation trap (not shown). The escape of steam may thus be prevented through the pipe 22 while water from the condensing chamber is carried off.

In the operation of the invention, cold water entering the heater passes directly through the steam chamber, causing condensation of the steam, part of the heat loss of condensation entering the water as it passes through the steam chamber. The partially heated water is returned spirally around the outside of the steam chamber, where it receives the remainder of the heat thrown off by condensation.

In the event of only a relatively small amount of water passing through the heater, this water is caused to circulate about the outer wall of the condensation chamber through the medium of a spirally arranged circulating rib 23 which is arranged within the outer water passage 17. This rib breaks up and distributes the water over the outer wall of the condensation chamber during its passage to the outlet 18.

The invention is susceptible of various changes in its form, proportions and minor details of construction and the right is herein reserved to make such changes as properly fall within the scope of the appended claim.

Having described the invention what is claimed is:—

A water heater comprising an outer casing closed at one end, a hollow header secured to and communicating with the other end of the casing and having a transversely disposed partition therein dividing the header into a water outlet compartment and a steam inlet compartment, an intermediate casing spaced from and extending longitudinally within the outer casing and having one end in communication with the steam inlet compartment, a water pipe extending through the intermediate casing and having its inner open end communicating with the space between the outer and intermediate casings and an annular spacing member closing the inner end of the intermediate casing and cooperating with the latter to provide a condensing chamber.

In testimony whereof I affix my signature.

DAVID F. PRISER.